(12) United States Patent
Zhao et al.

(10) Patent No.: US 9,912,678 B2
(45) Date of Patent: Mar. 6, 2018

(54) TECHNIQUES FOR AUTOMATICALLY MITIGATING DENIAL OF SERVICE ATTACKS VIA ATTACK PATTERN MATCHING

(71) Applicant: Verisign, Inc., Reston, VA (US)

(72) Inventors: Yujie Zhao, Reston, VA (US); Suresh Bhogavilli, Gaithersburg, MD (US); Anupam Kulkarni, Aldie, VA (US); Sivasankar Subramanian, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 14/748,571

(22) Filed: Jun. 24, 2015

(65) Prior Publication Data

US 2016/0381048 A1 Dec. 29, 2016

(51) Int. Cl.
*H04L 29/06* (2006.01)
(52) U.S. Cl.
CPC ...... *H04L 63/1416* (2013.01); *H04L 63/1458* (2013.01); *H04L 63/101* (2013.01); *H04L 63/168* (2013.01); *H04L 2463/141* (2013.01)
(58) Field of Classification Search
CPC ................................ H04L 63/20; H04L 63/08
USPC .......................................................... 726/23
See application file for complete search history.

(56) References Cited

U.S. PATENT DOCUMENTS 7,360,162 B2 * 4/2008 Shaw ...................... H04L 29/06
715/744

2006/0072505 A1 * 4/2006 Carrillo ................. H04L 41/042
370/331
2006/0168649 A1 * 7/2006 Venkat ................ H04L 63/1425
726/5
2010/0192201 A1 * 7/2010 Shimoni ................. G06F 21/55
726/3
2011/0055921 A1 * 3/2011 Narayanaswamy .......................
H04L 63/1458
726/22
2011/0099622 A1 4/2011 Lee et al.
2013/0254879 A1 * 9/2013 Chesla ................ H04L 63/1458
726/22

(Continued)

FOREIGN PATENT DOCUMENTS

EP 2557759 A1 2/2013
EP 2739003 A1 6/2014

OTHER PUBLICATIONS

Extended European Search Report Application No. 16176256.2, dated Nov. 8, 2016, 10 pages.

*Primary Examiner* — Haresh N Patel
(74) *Attorney, Agent, or Firm* — Artegis Law Group, LLP (57) ABSTRACT

A method for mitigating a denial of service attack includes determining, for a client, a number of requests being transmitted to a server and determining, for the client, that the number of requests for a time period is greater than a top talker threshold. The method includes classifying the client as a top talker based on the number of requests being greater than the top talker threshold and identifying, for the client, additional requests being transmitted to the server. The method also includes determining whether a number of the additional requests matches one or more attack patterns and preventing one or more of the additional requests from being transmitted to the server if the number of additional requests that matches one or more attack patterns is greater than a first threshold.

21 Claims, 8 Drawing Sheets

(56) References Cited

U.S. PATENT DOCUMENTS

| | | | | |
|---|---|---|---|---|
| 2014/0317738 A1* | 10/2014 | Be'ery | .................... | H04L 63/14 726/23 |
| 2014/0372512 A1* | 12/2014 | Clark | ...................... | H04L 67/42 709/203 |
| 2015/0033335 A1* | 1/2015 | Zhao | ................... | H04L 63/1416 726/22 |
| 2015/0373017 A1* | 12/2015 | Oelke | ................. | G06F 11/3048 726/9 |
| 2016/0080413 A1* | 3/2016 | Smith | ................ | H04L 63/1458 726/23 |
| 2016/0164912 A1* | 6/2016 | Del Fante | .......... | H04L 63/1458 726/23 |

* cited by examiner

TECHNIQUES FOR AUTOMATICALLY MITIGATING DENIAL OF SERVICE ATTACKS VIA ATTACK PATTERN MATCHING

BACKGROUND

The Internet, also commonly referred to as the "web," is a global system of interconnected networks that operate according to the Internet Protocol suite, allowing access to an extensive range of information that can be retrieved and accessed using the hypertext transfer protocol (HTTP). The Internet operates in a client-server format that distributes computing tasks and responsibilities between the service or resource providers, commonly referred to as "web servers," and service requesters, called clients. Typically, web servers are configured to accept requests from all clients, and the HTTP request generally provides little information about the requesting client that would enable the web servers to determine the nature of the client's intentions in making the request. While this open communication model serves to facilitate the transfer of knowledge and information, it may also leave web servers vulnerable to "cyber attacks," such as denial-of-service (DoS) attacks and distributed denial-of-service (DDoS) attacks.

In a DoS attack, a single client may attempt to overwhelm a server by sending a large number of requests to the server in rapid succession. As a result, an attacked web server may be slow or unable to respond to legitimate requests due to the burdens imposed on the server when servicing a flood of requests from a single malicious client. In a DDoS attack, rather than having a single client make all of the nuisance requests to the server, the attacker utilizes a network of different clients to simultaneously issue requests to the server. Such a network of requesting clients may be at the attacker's disposal, for example, by virtue of an in-place "botnet" in which hundreds or thousands of normal users' computers are infected by malware. This malware may be programmed to respond to commands issued by a central machine or authority, colloquially known as a "bot master." Bot masters make use of such a collection of infected machines in order to implement a DDoS attack on a server or enterprise.

In a DDoS attack, because the flood of requests may be spread over a large number of disparate clients, each with a different IP address, it may be difficult to detect which requests originate from legitimate clients and which requests originate from malicious clients, such as compromised machines in a botnet. Thus, a server may not be able to determine which requests it should ignore and which requests it should service, because all requests may appear substantially identical over the larger pool of IP addresses. While DDoS attacks may be mitigated, conventional mitigation techniques suffer from a number of drawbacks.

With experience, DDoS hacktivists are becoming sophisticated and can generate more efficient DDoS attacks by sending legitimate-appearing requests from a huge number of network sources targeting the victim servers's computationally expensive components to exhaust the application servers' computational power and stop them from serving legitimate clients. The computationally expensive requests are discovered by the hacktivists during their pre-attack exploration of the victim servers. Because those requests are legitimate, they can bypass mitigations easily; because they are computationally expensive, they can swamp the victim servers with less effort.

More seriously, hacktivists can rotate their attacking requests every so often to defeat traditional signature-based filters configured manually on mitigation platforms. In order to mitigate a DDoS attack like this, operators usually need to identify the attack patterns first and then configure their mitigation platforms with the patterns. Because this is a relative manual process, it cannot keep up with the variation of the attacking requests and results in sluggish mitigation. There is therefore a need for methods and systems for overcoming these drawbacks and other challenges of identifying and mitigating a DoS attacks.

SUMMARY

According to aspects of the present disclosure, a method for mitigating a denial of service attack. The method includes determining, for a client, a number of requests being transmitted to a server. The method also includes determining, for the client, that the number of requests for a time period is greater than a top talker threshold. Further, the method includes classifying the client as a top talker based on the number of requests being greater than the top talker threshold. The method additionally includes identifying, for the client, additional requests being transmitted to the server. The method also includes determining whether a number of the additional requests matches one or more attack patterns. The method further includes preventing one or more of the additional requests from being transmitted to the server if the number of additional requests that matches one or more attack patterns is greater than a first threshold.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

Figure 1A:
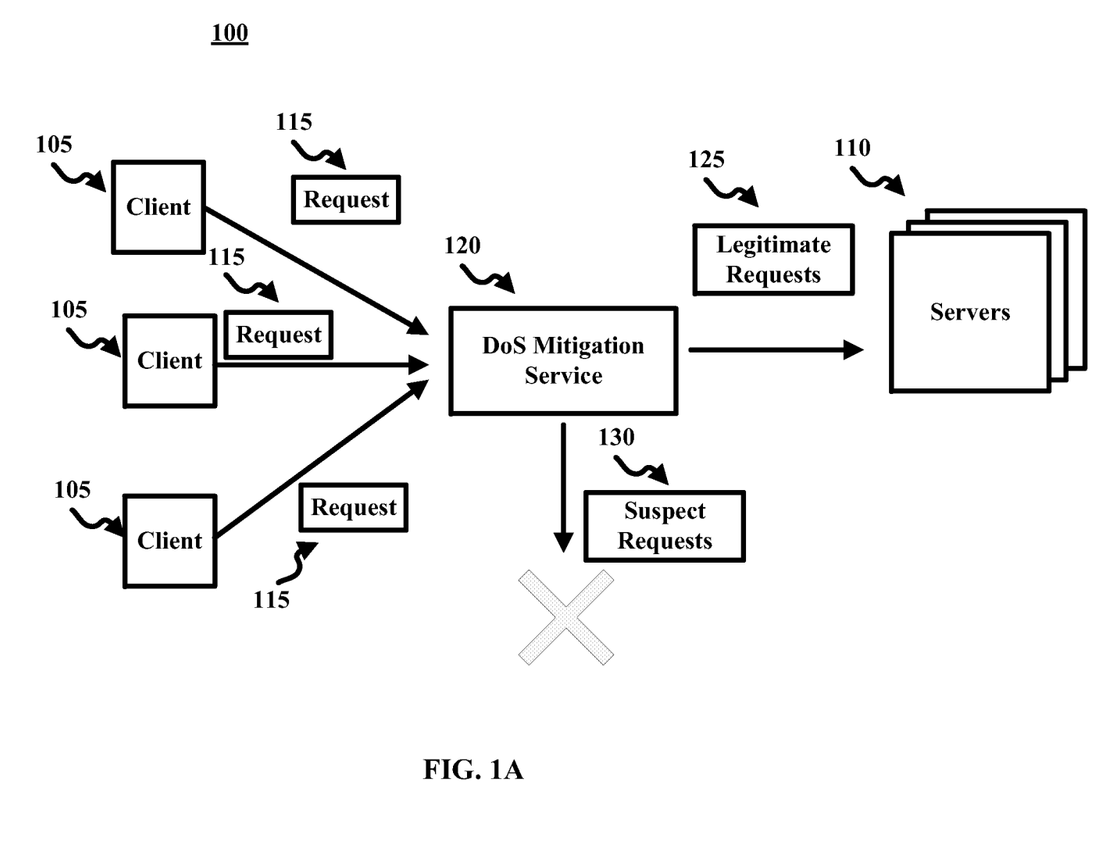
FIGS. 1A and 1B illustrate a network environment including a DoS mitigation service, according to various aspects of the present disclosure.
Figure 1B:
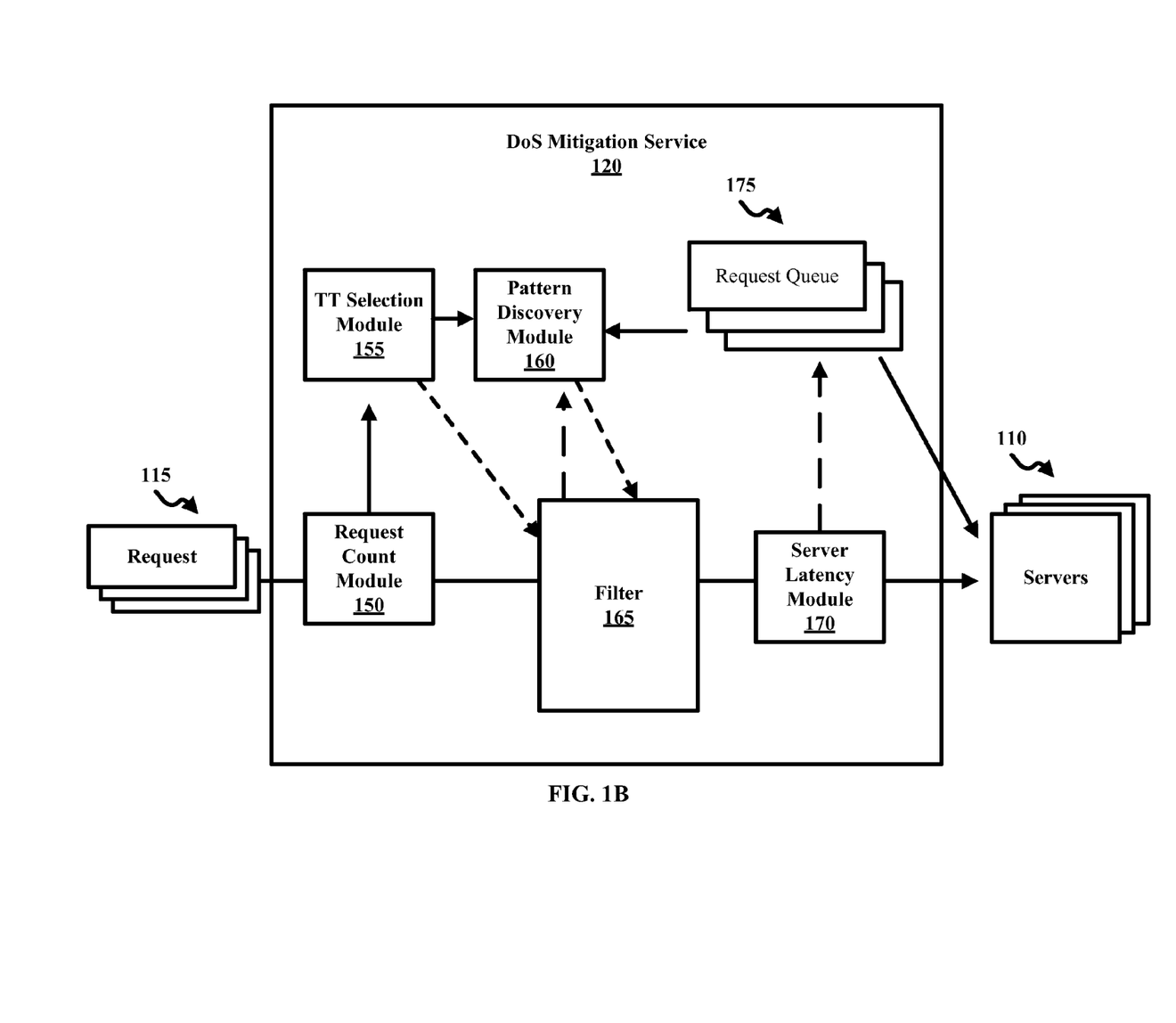

FIGS. 1A and 1B are diagrams illustrating a network environment 100 according to aspects of the present disclosure. While FIGS. 1A and 1B illustrate various components contained in the network environment 100, FIGS. 1A and 1B illustrate one example of a network environment and additional components can be added and existing components can be removed.

As illustrated in FIG. 1A, the network environment 100 can include one or more clients 105 that desire to communicate with one or more servers 110. The servers 110 can be owned, operated, leased and/or managed by one or more entities to provide data, services, content, etc. to the clients 105. The clients 105 can communicate with the one or more servers via one or more networks, public or private. The networks can be any appropriate network or other communication link that allows communication between or among one or more computing systems and/or devices, such as, for example, the clients 105 and the servers 110. The networks can be wired, wireless, or any combination thereof. The networks can include, for example, the Internet, a local area network, a wide area network, a WiFi network, a workstation peer-to-peer network, a direct link network, a Bluetooth connection, a bus, or any other suitable communication network or any combination thereof.

The clients 105 can include any type of electronic device and/or component configured to execute one or more processes, many of which are known in the art. The clients 105 can include, by way of example and not limitation, clients, desktop computers, laptop computers, network computers, workstations, personal digital assistants (PDA), tablet PCs, telephony devices, wireless base stations, wireless access devices, pagers, musical devices, routers, hubs, cameras, printers, copiers, scanners, projectors, alarms, lights, home entertainment systems, audio/visual systems, home security devices, intercoms, domestic robots, appliances, HVAC systems, etc., or any component or sub-component of another computing device or assemblage, such as, for example, a car, a train, a plane, a boat, etc. The clients 105 can also include servers and/or databases. The clients 105 can be configured to transmit and/or receive information to and/or from the servers 110 directly and/or indirectly via any combination of wired and/or wireless communication systems, methods, and devices.

The servers 110 can be configured to receive and processes one or more requests 115 from the clients 105. For example, the servers 110 can include commercial web servers that service hypertext transfer protocol (HTTP) requests and/or hypertext transfer protocol secure (HTTPS) requests from clients 110 for web pages hosted by the servers 110. Although the servers 110 can operate one or more applications or provide one or more public-facing network services, the servers 110 comprise any servers capable of being subjected to a cyber attack, such as a DoS or DDoS attack, and need not operate any particular application or host any particular services. For example, although the servers 110 can include commercial web servers that are configured to receive and service legitimate HTTP requests, the servers 110 subject to a cyber attack can and frequently do receive and respond to HTTP requests that are not related to web pages hosted by the web servers.

The servers 110 can be physical computers, or computer systems, configured to run one or more services to support users of other computers on one or more networks and/or computer programs executing on physical computers, or computer systems, and configured to serve the requests of other programs that may be operating on one or more servers or on other computing devices, such as the clients 105. The servers 110 can include, by way of example and not limitation, communication servers, database servers, fax servers, file servers, mail servers, print servers, name servers, web servers, proxy servers, gaming servers, etc. In some aspects, the servers 110 can be configured to transmit and/or receive information to and/or from clients 105, other servers (e.g., application servers Internet Service Provider (ISP) servers, etc.), and/or databases directly and/or indirectly via any combination of wired and/or wireless communication systems, method, and/or devices.

According to aspects of the present disclosure, the network environment 100 can include a DoS mitigation service 120. In some aspects, the DoS mitigation service 120 can be configured monitor and intercept the requests 115 to the servers 110. In some aspects, the DoS mitigation service 120 can be configured to identify one or more of the requests 115 as legitimate requests 125 and suspect requests 130, for example, part of a DoS or DDoS attack. The DoS mitigation service 120 can be configured to filter out the suspect requests 130 and forward the legitimate requests 125 to the servers 110. In some aspects, the DoS mitigation service 120 can monitor the servers 110 for the purpose of determining whether the servers 110 are receiving and responding to network communications and/or are otherwise functioning in a normal or expected manner or whether the servers 110 are functioning in an abnormal manner that may indicate the presence of a DoS attack. As used herein, a "DoS attack" may refer to a traditional DoS attack, in which all malicious requests or communications originate from a single device, a DDoS attack, in which multiple, separate devices may participate in the attack, and/or any other type of cyber attacks.

The DoS mitigation service 120 can include one or more physical servers, or server systems, and/or one or more proxy servers, each configured to run one or more services to support other computers or computer systems, such as, for example, the servers 110. In some aspects, the DoS mitigation service 120 can be configured to monitor the requests 115 from the clients 105 and monitor the servers 110, themselves. The DoS mitigation service 120 can also be configured to prevent, detect, and respond to DoS attacks targeting the servers 110. In some aspects, the DoS mitigation service 120 can be implemented in one or more of the severs 110 and/or one or more separate proxy servers.

In some aspects, a third-party mitigation service provider can operate the DoS mitigation service 120, which the servers 110, pursuant to a commercial mitigation service provided to the owners and/or operators of the servers 110. The DoS mitigation service 120 can communicate with the servers 110 using an indirect network connection, such as a connection through the network. The DoS mitigation service 120 can also communicate with the servers 110 using a direct communications link or a communications link separate from other networks. The DoS mitigation service 120 can be within the network path between clients 105 and the servers or can be outside of the communication path.

In some aspects, the DoS mitigation service 120 can be owned or operated by a third party that provides proxy services as part of a broader DoS mitigation service. One advantage of employing a separately-owned or operated mitigation server system may be the third party service provider's ability to bear computational and connection burdens that a customer's server system could not. For example, owner and/or operator of the servers 110 can be a small company that does not have the resources to operate the DoS mitigation service 120. Or, even if the owner and/or operator also operated separate proxy servers, such proxy servers might not be able to bear the burden of a full DDoS attack. This aspect of the DoS mitigation service 120 be contrasted with conventional systems that focus on equipping servers that are being attacked or other servers operated by the attacked entity to filter legitimate requests from malicious requests. These systems fail when filtering operations themselves are sufficient to overwhelm the owner of the attacked servers or associated proxy servers.

In implementations, the clients 105 can communicate directly with the servers 110 via the network using standard Internet Protocols, such as HTTP, transmission control protocol (TCP), internet protocol (IP), etc. For example, HTTP requests from the client 105 can be encapsulated in TCP segments, IP datagrams, and Ethernet frames and transmitted to the. In some aspects, third parties may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications from the clients 105 to the servers 110.

According to aspects of the present disclosure, the DoS mitigation service 120 can be configured to perform a process to automatically rate limit possible attack requests on a per-client basis to handle DoS and DDoS attacks more effectively. The process performed by the DoS mitigation service 120 can include two parts. In some aspects, the DoS mitigation service 120 can utilize top talkers' requests to discover attack patterns. In some aspects, the DoS mitigation service 120 can utilize on internally queued requests to the protected application servers to discover attack patterns. As discussed herein, a "top talker" can include a client 105 that is transmitting a number of requests 115 that is greater than a determined threshold.

FIG. 1B illustrates one example of the components of the DoS mitigation service 120 for performing the process, according to aspects of the present disclosure. As illustrated in FIG. 1B, the DoS mitigation service 120 can include a request count module 150, a top talker (TT) selection module 155, a pattern discovery module 160, a filter 165, a server latency module 170, and request queues 175. In some aspects, the request count module 150, the TT selection module 155, the pattern discovery module 160, and the filter 165 can be configured to perform discovery of the top talkers and rate limiting of the top talkers based on discovered attack patterns. In some aspects, the server latency module 170 and the requests queues 175 can be configured to monitor the servers 110 to maintain the latency of the servers 110 and supply requests to the pattern discovery module 160 for analysis.

Figure 3:
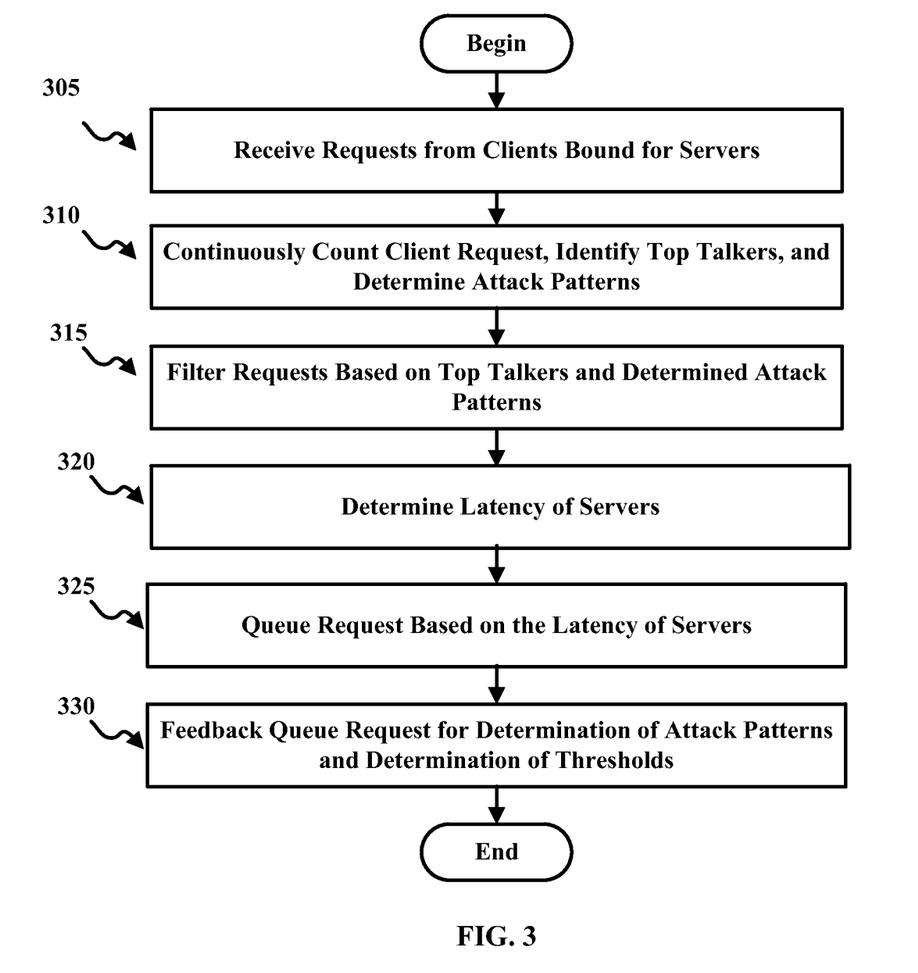
FIG. 3 illustrates an example of a process for identifying and mitigating DoS attacks, according to various aspects of the present disclosure.

FIG. 3 illustrates one example of a process that can be performed by the DoS mitigation service 120 to identify and mitigate DoS and DDoS attacks, according to aspects of the present disclosure. While FIG. 3 illustrates various stages that can be performed, stages can be removed and additional stages can be added. Likewise, the order of the illustrated stages can be performed in any order.

Figure 4A:
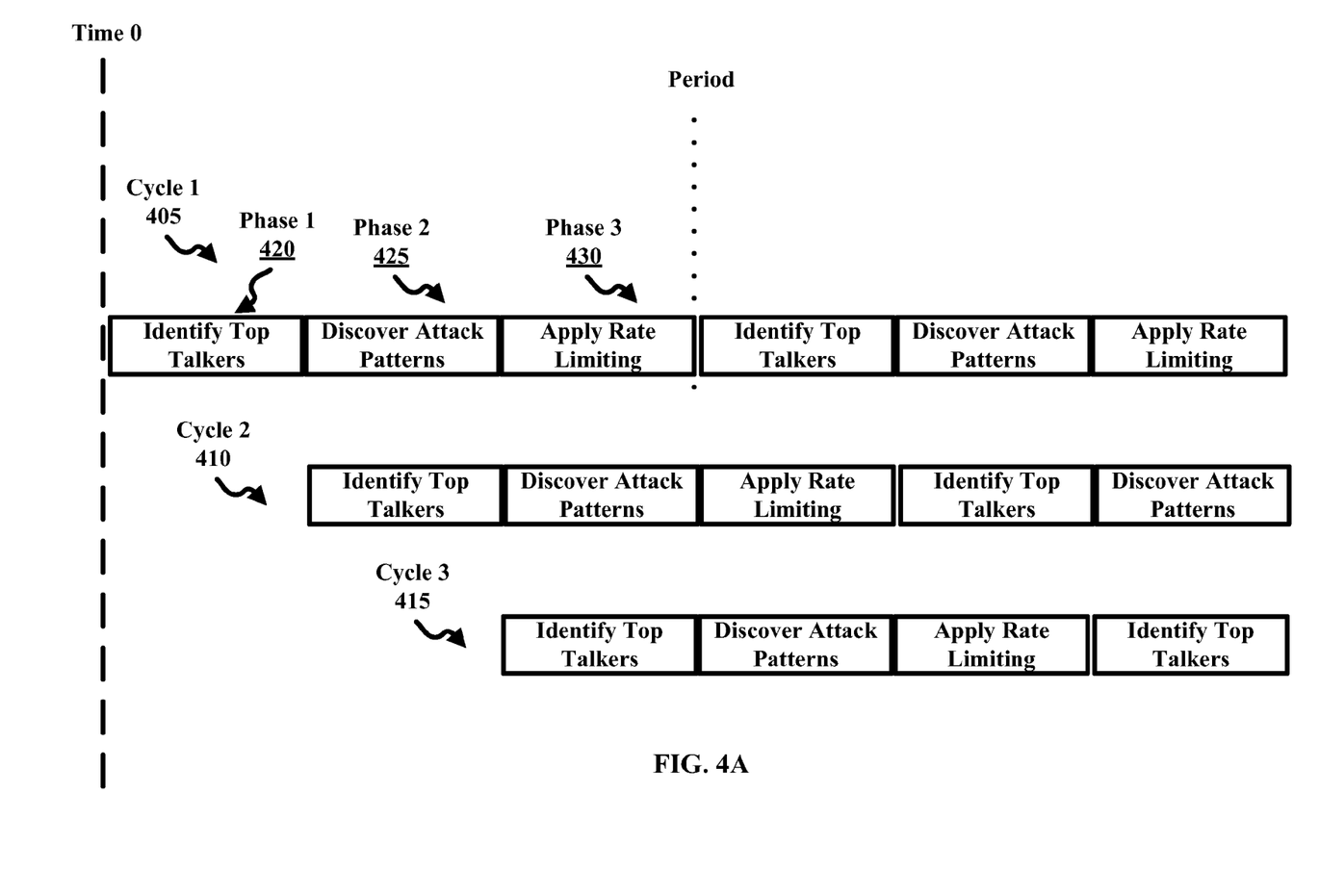
FIGS. 4A and 4B illustrate an example of sequence of phases in the process for identifying and mitigating DoS attacks, according to various aspects of the present disclosure.

After the process begins, in 305, the DoS mitigation service 120 can receive requests from the client 105 that are bound for the servers 110. In 310, the DoS mitigation service 120 can continuously count client requests, identify top talkers, and determine attack patterns. According to aspects of the present disclosure, in 310, the DoS mitigation service 120 can be configured to perform a process that consists of continuous and overlapping cycles. FIG. 4A illustrates an example of three of the cycles: cycle 1 405, cycle 2 410, and cycle 3 415. Each cycle in the process can include three phases: phase 1 420, phase 2 425, and phase 3 430. In the phase 1 420, the DoS mitigation service 120 can identify top talkers from all the clients 105 making the requests 115. Top talkers can send more requests than common clients and, during the denial of service attacks, can likely be the hacking sources or botnets.

In the phase 2 425, the DoS mitigation service 120 can study the requests 115 from the top talkers. During the studying, the DoS mitigation service 120 can identify the patterns which can represent most of those requests are extracted. During the pattern extraction, only common request features can be considered and random features can be ignored on purpose so that the final patterns can be representative of a potential DoS or DDoS attack.

In the phase 3 430, the DoS mitigation service 120 can apply the attack patterns to all incoming requests 115 to rate limit the matching requests from each client 105. For a determined time period, the DoS mitigation service 120 can count, per client 105, all the requests 115 which match the attack patterns. In some aspects, the DoS mitigation service 120 can determine that a few of the requests 115 that match the attack patterns are acceptable because the related requests can be completely legitimate. As such, clients 105, which are legitimate, can be allowed to send matching requests without getting caught up in the DoS and DDoS mitigation. It, however, may be unlikely that a client 105, which is legitimate, would send matching requests very frequently in a given period of time.

In 315, if a client 105 sends a number matching requests over a threshold, the client 105 can be identified as being suspect requests 130 and further matching requests can be filtered out. If the client 105 continues to send more matching requests beyond maximum threshold, the DoS mitigation service 120 can blacklist the client 105 for a configurable amount of time. By rate limiting and filtering requests this way, the clients 105, which are legitimate, are not impacted because the matching requests can still pass through, but attackers are identified and traffic from them dropped and potentially the attack sources can be blacklisted.

As illustrated in FIG. 4A, cycle 1 405, cycle 2 410, and cycle 3 415 can be continuous and overlapped. After each period of the three phases, cycle 1 405, cycle 2 410, and cycle 3 415 repeats itself again and again. Because the cycle 1 405, cycle 2 410, and cycle 3 415 are overlapped and continuous, at any moment top talkers are identified, attack patterns are discovered, and rate limiting with the previously discovered patterns is applied. The cycle 1 405, cycle 2 410, and cycle 3 415 are overlapped so that each cycle is one phase ahead of another. This way, at any given time, when one cycle is in phase 1 420, the other two are in phase 2 425 and phase 3 430, respectively. This way, when attack patterns are changed from time to time, the DoS mitigation service 120 can adapt to the changes and continue mitigation.

Figure 4B:
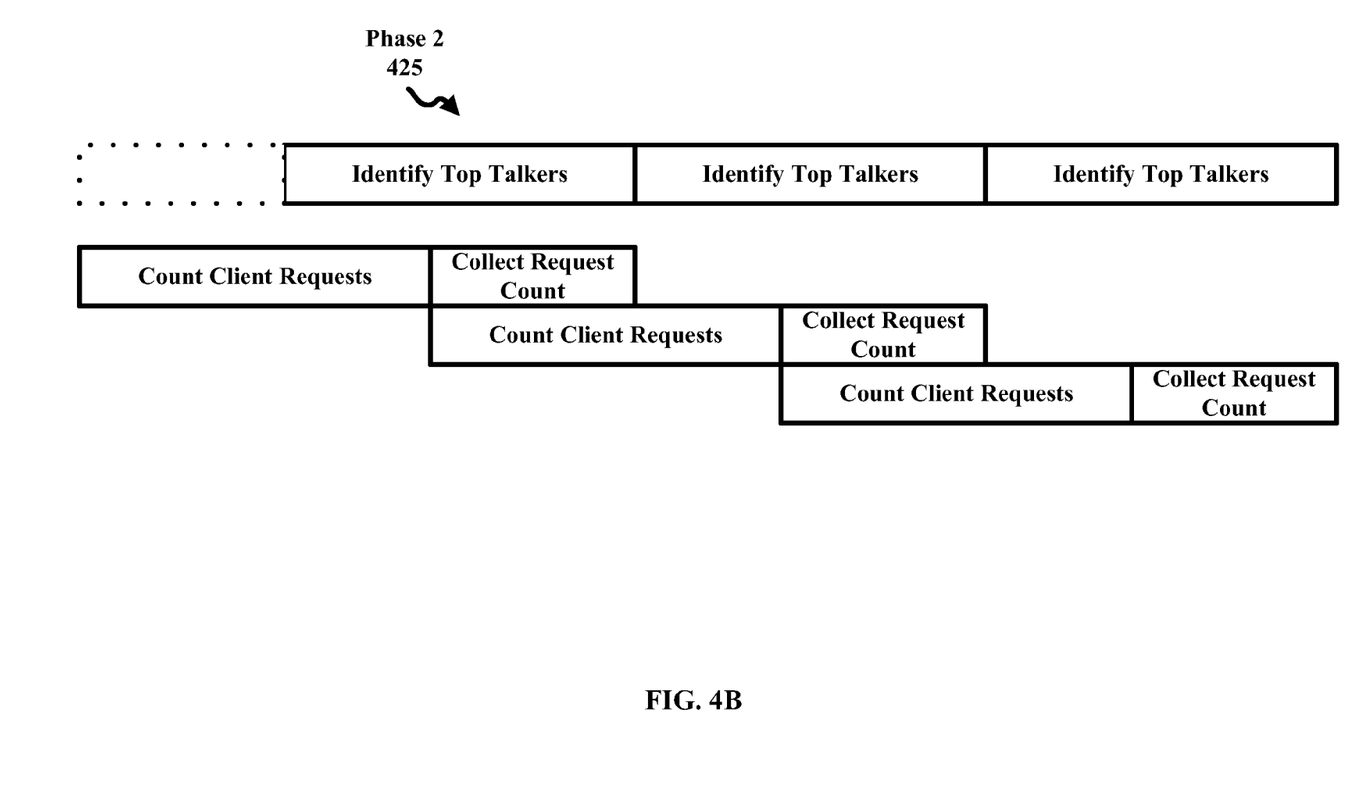

In some aspects, in 310 and 320, the request count module 150, the TT selection module 155, the pattern discovery module 160, and the filter 165 can be configured to perform discovery of the top talkers and rate limiting of the top talkers based on discovered attack patterns. The phase 1 425 can include two overlapping sub-phases, as illustrated in FIG. 4B. The request count module 150 can count requests from each client 105 and save a client 105 count in that client 105 internal data structure. The internal data structure can be any type of data structure, for example, a counter. The internal data structure can include multiple sections to records various counts for each client, such as the current request count and the previous request count. At the end of the first sub-phase, the request count module 150 can begin transfer of clients' counts to the TT selection module 155. Once given to the TT selection module 155, the request count module 150 can copy the current request count to the previous request count in its data structure and reset the current request count to zero to prepare for the next period. The previous request count of a client 105 can be used later, by the TT selection module 155 to determine whether this client 105 is a top talker. In the second sub-phase, the TT selection module 155 waits for all active clients' request counts and decides a top talker threshold at the end of this phase based on all the received client request counts. The top talker threshold can be determined by any process or method to determine an expected request count based on all client request counts, such as statistical algorithms. When a top talker threshold is available, the TT selection module 155 can use the threshold to decide if a client 105 is a top talker when the threshold is less than the client's previous request count.

In the phase 2 425, the pattern discovery module 160 receives requests either for a top talker determine by the TT selection module 155 or from the queued requests in request queues 175. At the end of the phase 2 425, the pattern discovery module 160 can discover common patterns from those requests, which can represent most of the requests. The pattern discovery module 160 can examine all the available HTTP header fields in those requests such as the request URL in a request line, User-Agent field, Referer Field, etc. For example, during an attack, the requests from the botnets can target some computationally intensive components of a server 110 and query them repeatedly; sometimes the requests can rotate their User-Agent field from a list of preconfigured user agents; and other times the requests show the same referrer in the Referer Field. All of these can become attack patterns and be discovered by the pattern discovery module 160. Sometimes, hacktivists try to defeat detection by using random values in the requests 115. For instance, they can add random values as either request parameter names or values in a request URL. The pattern discovery module 160 can detects and ignore these random values. When new attack patterns are available at the end of phase 2 425, they replace the existing attack patterns and can be used by the filter 165 in the rate limiting phase.

The phase 3 430 can limit client 105 requests based on the available attack patterns. The filter 165 can filter each request from a client based on the attack patterns. Once a request matches any of the patterns, the client's matching request count, maintained by the filter 165 can be increased by one. In the phase 3 430, the filter 165 can use two thresholds. The first threshold can be less than the second threshold and used to identify suspect clients 105. When a client's matching request count is less than the first threshold, its matching requests are not rate limited, so that if it is a valid request, a legitimate client can still get a response. When a client's matching request count is greater than the first threshold, the filter 165 can identify this client 105 as a suspect and rate limit further matching requests to the first threshold. When a client's matching request count is greater than the second threshold, the filter 165 can identify the client 105 as an attacking source for certain and can blacklist the client 105 a preconfigured period of time (dropping all requests from that client for that period). The two thresholds can have the same value and that means a client is blacklisted when it becomes suspect. A client's matching request count can be reset at the end of the phase 3 430, so legitimate clients can send matching requests without being impacted.

Returning to FIG. 3, in 320, the DoS mitigation service 120 can determine the latency of the servers 110. In addition to the pattern discovery from top talkers, the DoS mitigation service 120 can monitor the server 110 to determine if the latency of processing the request 115 goes above an acceptable amount. For example, the server latency module 170 can actively monitor the response latencies from the server 110 to determine the mean/median response latency of the servers 110. Likewise, the server latency module 170 can receive data representing the latency from the servers 110. In 325 the DoS mitigation service 120, can store the requests 115 in the requests queues 175. The server latency module 170 can also determine queuing delays in the request queues 175. For example, the queuing delays can be determined by as a combination of number of request in the request queues 175 and the latency, e.g., length of the queue*the mean or median response latency. If the latency (or queuing delays) goes above an acceptable amount, in 325, the DoS mitigation service 120 can start mitigation, as discussed below. The DoS mitigation service 120 can also adjust the two thresholds to manage the queuing delays within acceptable levels, and can also feed waiting requests to the pattern discovery module 160 to expand on the request filters, as discussed below. This allows the DoS mitigation service 120 to prevent the servers 110 from becoming overwhelmed with requests.

In 330, the DoS mitigation service 120 can feedback one or more of the queued requests for determination of attack patterns and determination of thresholds. In some aspects, the DoS mitigation service 120 discovers attack patterns from queued requests to the servers 110 when top talkers are not obvious. Sometimes, a more elusive DDoS attack can be generated when hacktivists employ tens of thousands of botnets or even more and let each botnet send out attack requests at a very low rate just like legitimate clients. With the overall botnets used, the attack floods the servers 110 the same way and meanwhile can make identifying top talkers difficult. When requests start to be queued, the DoS mitigation service 120 can examine the queued requests and extract attack patterns from them. Once the attack patterns are discovered, DoS mitigation service 120 can use the patterns to rate limit all clients 105 with smaller thresholds which fit for this type of attacks. In some aspects, the DoS mitigation service 120 can perform the rate limiting as discussed above. In some aspects, this part of the method may have only two phases in each cycle and, like the first part. Each cycle can be continuous and overlapping so that this mitigation process can stay on the top of the variations of attacks and keep discovering attack patterns and keep rate limiting with the previously discovered patterns.

In 330, the latency of the servers 110 and number of queued requests can be utilized to modify the first and the second thresholds. In aspects, the mitigation service 120 can automatically turn itself on and off based on the server 110 latency and the number of requests queued to the server 110. The DoS mitigation service 120 can monitor the server 110 latency, can estimate how many requests can be handled by the server 110 in a time period (e.g., a second) based on the latency, and can count the number of requests queued to be sent to the server 110. If the queued requests will take the server 110 more than a predetermined time period (e.g., three seconds) to handle, the DoS mitigation service 120 can be turned on automatically and the processes described above can be performed. This means that there are too many requests for the server to handle and potentially the server 110 is under attack. If there are no queued requests to the server or if there are queued requests to the server but those requests can be handled by the server 110 in less than the predetermined time period, and the number of blacklisted clients is zero, the first and second thresholds can be increased each cycle, ultimately turning off the DoS mitigation service 120 automatically. This means the server is in a good condition and the attack has subsided.

In 330, in aspects, the DoS mitigation service 120 can automatically adjust the first and second thresholds used in the filter module 165, the first threshold to drop additional requests from a client and the second threshold to blacklist a client. As in the on/off condition above, the DoS mitigation service 120 can monitor the number of requests queued to the server 110. If more and more requests are queued, the two thresholds used in filter module 165 can be both automatically decreased until the queued requests can be handled by the server 110 in the predetermined time period (e.g., three seconds). If less requests are queued, the first and second thresholds will be both automatically increased until the queued requests can be handled by the server 110 in the predetermined time period.

According to aspects as described above, the method described below allows rate limiting with the discovered attack patterns to mitigate a DoS or DDoS attack. Instead of using known signatures to deterministically identify and filter bad traffic, the DoS mitigation service 120 automatically adapts to changes in the attacks and limits/filters the most likely attack traffic even as it lets a limited amount of attack traffic pass through. The DoS mitigation service 120 may not pinpoint each attacking request upfront, but can instead detect attacking sources or botnets with the amount of matching requests from them. The DoS mitigation service 120 can eventually block any further requests from them. By rate limiting, the DoS mitigation service 120 can throttle the traffic to the servers 110 and make sure the servers 110 can stay operational although the traffic to the servers 110 can include some attacking requests. Second, the attacking sources or botnets are not like common clients and can generate abnormal large amount of requests during a given period of time or send requests matching some attack patterns. The DoS mitigation service 120 does not disturb the legitimate client 105 activities because the volume of their traffic is relatively low and their requests do not show patterns. Additionally, the discovered attack patterns are not required to be absolutely correct because of the tolerance of a certain amount of matching requests from each client during the rate limiting. Furthermore, the DoS mitigation service 120 can be completely automatic without the need any human supervision other than specifying the parameters within which the system can operate. When generating signatures from queued requests, we try to find the signatures which match a majority of requests rather than all of them. That way, the DoS mitigation service 120 avoids capturing legitimate requests from legitimate sources.

Figure 5A:
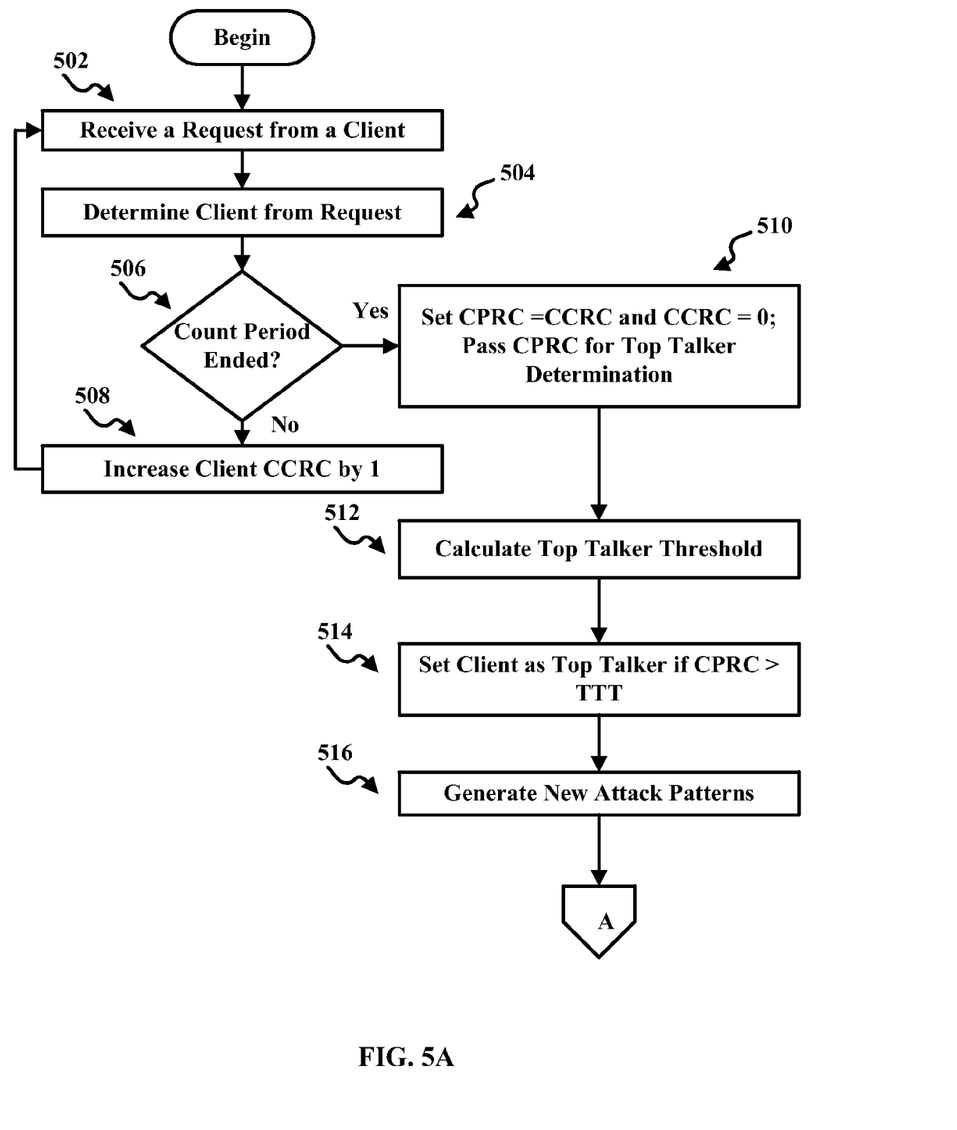
FIGS. 5A and 5B illustrate another example of a process for identifying and mitigating DoS attacks, according to various aspects of the present disclosure.
Figure 5B:
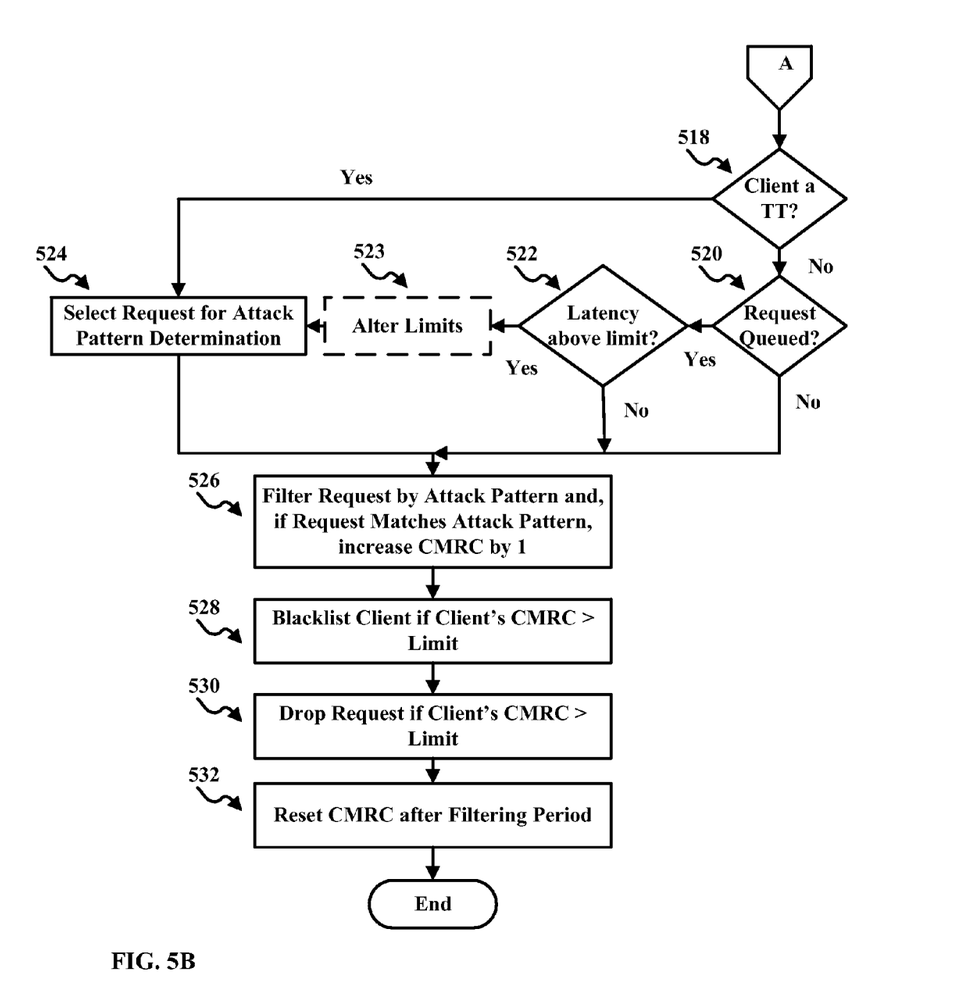

FIGS. 5A and 5B show a further example process described above, according to aspects consistent with the present disclosure. While FIGS. 5A and 5B illustrate various stages that can be performed, stages can be removed and additional stages can be added. Likewise, the order of the illustrated stages can be performed in any order.

After the process begins, in 502, the DoS mitigation service 120 can receive a request from a client 105. In 504, the request count module 150 can determine the client 105 that sent the request. For example, the request count module 150 can use the client 105 source IP address or examine the parts of the request, e.g. HTTP header fields in those requests such as the request URL in a request line, User-Agent field, Referer field, X-Forwarded-For field, etc. to identify the client 105.

In 506, the request count module 150 determines if the count period has ended. If the period has not ended, the request count module 150 increases the client 105 client current request counter (CCRC) by one and waits for additional requests from the client 105. If the period has ended, the request count module 150 sets the client previous request counter (CPRC) to the value of the CCRC and sets the CCRC to 0. The request count module 150 also passes the CPRC to the TT selection module 155 for top talker determination.

Next, in 512, the TT selection module 155 calculates the top talker threshold. The top talker threshold (TTT) can be determined by any process or method to determine an expected request count based on all client request counts, such as statistical algorithms. In 514, the TT selection module 155 can set the client 105 as a top talker if the CPRC is greater than the TTT.

In 516, the pattern discovery module 160 can generate new attack patterns. The pattern discovery module 160 receives requests either for a top talker determine by the TT selection module 155 or from the queued requests in request queues 175. At the end of the phase 2 425, the pattern discovery module 160 can discover common patterns from those requests, which can represent most of the requests. The pattern discovery module 160 can examine all the available HTTP header fields in those requests such as the request URL in a request line, User-Agent field, Referer Field, etc. For example, during an attack, the requests from the botnets can target some computationally intensive components of a server 110 and query them repeatedly; sometimes the requests can rotate their User-Agent field from a list of preconfigured user agents; and other times the requests show the same referrer in the Referer Field. All of these can become attack patterns and be discovered by the pattern discovery module 160. Sometimes, hacktivists try to defeat detection by using random values in the requests 115. For instance, they can add random values as either request parameter names or values in a request URL. The pattern discovery module 160 can detects and ignore these random values.

Moving to FIG. 5B, in 518, the DoS mitigation service 120 can determine if the client 105 is a top talker. If the client 105 is a top talker, in 524, the pattern discovery module 160 considers the request from the client 105 for attack pattern discovery. In 526, if the request matches the current discovered attack pattern, the filter 165 can increase the client matching request counter (CMRC) by 1. In 528, the filter 165 can also blacklist the client 105 if the CMRC is greater than the blacklist limit. In 530, if the CMRC is greater than the filter limit, the filter 165 can filter the request, i.e., prevent the request from being transmitted to the server 110.

In 518, if the client is not a TT, the DoS mitigation service 120 can determine if any request to the servers are queued, in 520. If there are no requests queued, the DoS mitigation service 120 can proceed to 526. If there are requests queued, the DoS mitigation service 120 can determine if the latency (or queuing delays) in processing the requests is above a limit. If the latency is not above the limit, the DoS mitigation service 120 can proceed to 526. If latency is above the limit, the DoS mitigation service 120 can proceed to 523 and optionally alter one or more limits. For example, The DoS mitigation service 120 can monitor the server 110 latency, can estimate how many requests can be handled by the server 110 in a time period (e.g., a second) based on the latency, and can count the number of requests queued to be sent to the server 110. If the queued requests will take the server 110 more than a predetermined time period (e.g., three seconds) to handle, this means that there are too many requests for the server to handle and potentially the server 110 is under attack. The DoS mitigation service 120 can automatically adjust the first and second thresholds used in the filter module 165, the first threshold to drop additional requests from a client and the second threshold to blacklist a client. The DoS mitigation service 120 can monitor the number of requests queued to the server 110. If more and more requests are queued, the two thresholds used in filter module 165 can be both automatically decreased until the queued requests can be handled by the server 110 in the predetermined time period (e.g., three seconds). If less requests are queued, the first and second thresholds will be both automatically increased until the queued requests can be handled by the server 110 in the predetermined time period. In some aspects, the monitoring and alteration of the limits can be performed whether or not the client is a TT.

During the matching stage, the DoS mitigation service 120 can perform 518 for the requests received from a client 105. After the period ends, the filter 165 can request reset the CMRC.

In the above process, one or more of the stages may be turned off/on (e.g., preformed or not performed) based on the latency (or queuing delays) of the servers. For example, the mitigation service 120 can automatically turn itself on and off based on the server 110 latency and the number of requests queued to the server 110. The DoS mitigation service 120 can monitor the server 110 latency, can estimate how many requests can be handled by the server 110 in a time period (e.g., a second) based on the latency, and can count the number of requests queued to be sent to the server 110. If the queued requests will take the server 110 more than a predetermined time period (e.g., three seconds) to handle, the DoS mitigation service 120 can be turned on automatically and the processes described above can be performed. This means that there are too many requests for the server to handle and potentially the server 110 is under attack. If there are no queued requests to the server or if there are queued requests to the server but those requests can be handled by the server 110 in less than the predetermined time period, and the number of blacklisted clients is zero, the first and second thresholds can be increased each cycle, ultimately turning off the DoS mitigation service 120 automatically. This means the server is in a good condition and the attack has subsided.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
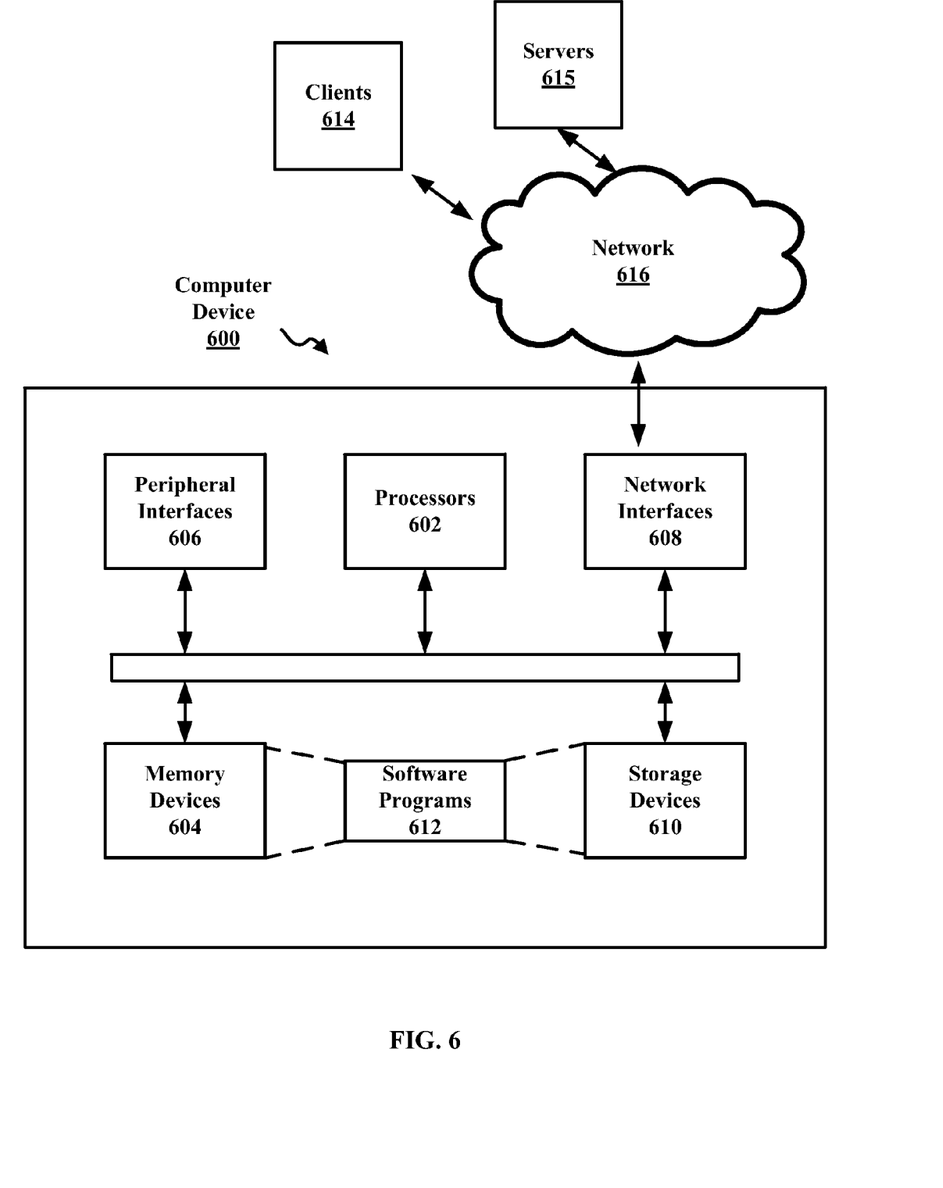
FIG. 6 illustrates an example of a hardware configuration for a computer device, according to various aspects of the present disclosure.

For example, FIG. 6 illustrates an example of a hardware configuration for a computer device 600, that can be used to perform one or more of the processes of DoS mitigation service 120 described above. While FIG. 6 illustrates various components contained in the computer device 600, FIG. 6 illustrates one example of a computer device and additional components can be added and existing components can be removed.

The computer device 600 can be any type of computer devices, such as desktops, laptops, servers, etc., or mobile devices, such as smart telephones, tablet computers, cellular telephones, personal digital assistants, etc. As illustrated in FIG. 6, the computer device 600 can include one or more processors 602 of varying core configurations and clock frequencies. The computer device 600 can also include one or more memory devices 604 that serve as a main memory during the operation of the computer device 600. For example, during operation, a copy of the software that supports the DoS mitigation service 120 can be stored in the one or more memory devices 604. The computer device 600 can also include one or more peripheral interfaces 606, such as keyboards, mice, touchpads, computer screens, touchscreens, etc., for enabling human interaction with and manipulation of the computer device 600.

The computer device 600 can also include one or more network interfaces 608 for communicating via one or more networks, such as Ethernet adapters, wireless transceivers, or serial network components, for communicating over wired or wireless media using protocols. The computer device 600 can also include one or more storage device 610 of varying physical dimensions and storage capacities, such as flash drives, hard drives, random access memory, etc., for storing data, such as images, files, and program instructions for execution by the one or more processors 602.

Additionally, the computer device 600 can include one or more software programs 612 that enable the functionality of the DoS mitigation service 120 described above. The one or more software programs 612 can include instructions that cause the one or more processors 602 to perform the processes described herein. Copies of the one or more software programs 612 can be stored in the one or more memory devices 604 and/or on in the one or more storage devices 610. Likewise, the data, for example, DNS records, utilized by one or more software programs 612 can be stored in the one or more memory devices 604 and/or on in the one or more storage devices 610.

In implementations, the computer device 600 can communicate with one or more client 614 and servers 615 via a network 616. The one or more client 614 and servers 615 can be any types of devices as described above. The network 616 can be any type of network, such as a local area network, a wide-area network, a virtual private network, the Internet, an intranet, an extranet, a public switched telephone network, an infrared network, a wireless network, and any combination thereof. The network 616 can support communications using any of a variety of commercially-available protocols, such as TCP/IP, UDP, OSI, FTP, UPnP, NFS, CIFS, AppleTalk, and the like. The network 616 can be, for example, a local area network, a wide-area network, a virtual private network, the Internet, an intranet, an extranet, a public switched telephone network, an infrared network, a wireless network, and any combination thereof.

The computer device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 600 as described above need not be enclosed within a single enclosure or even located in close proximity to one another. Those skilled in the art will appreciate that the above-described componentry are examples only, as the computer device 600 can include any type of hardware componentry, including any necessary accompanying firmware or software, for performing the disclosed implementations. The computer device 600 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for mitigating a denial of service attack, the method comprising:
   determining that a number of requests transmitted by a first client to a server during a first time period is greater than a first threshold;
   in response, classifying the first client as a top talker;
   generating one or more first attack patterns based on the requests transmitted by the first client to the server;
   determining, at least partially in parallel with generating the one or more first attack patterns, that a number of requests transmitted by a second client to a server during a second time period is greater than the first threshold;
   identifying additional requests being transmitted by at least one of the first client and the second client to the server;
   determining that a number of the additional requests transmitted by the at least one of the first client and the second client to the server matches the one or more first attack patterns; and
   preventing one or more of the additional requests from being transmitted to the server if the number of additional requests is greater than a second threshold.

2. The method of claim 1, the method further comprising:
   blacklisting at least one of the first client and the second client for a predetermined time if the number of additional requests transmitted by the first client or the second client that matches the one or more first attack patterns is greater than a third threshold.

3. The method of claim 2, the method further comprising:
   determining, for the server, that a latency of processing queued requests exceeds a first limit.

4. The method of claim 3, the method further comprising:
   determining one or more additional attack patterns based on one or more of the queued requests.

5. The method of claim 3, the method further comprising:
   adjusting the first threshold and the third threshold in response to the determination that the latency of processing queued requests exceeds the first limit.

6. The method of claim 3, the method further comprising:
determining, for the server, that the latency for processing queued requests falls below a second limit; and
ceasing mitigation of the denial of service attack in response to the latency falling below the second limit.

7. The method of claim 1, further comprising:
generating, at least partially in parallel with preventing the one or more additional requests from being transmitted to the server, one or more second attack patterns based on the requests transmitted by the second client to the server.

8. The method of claim 1, further comprising:
determining, at least partially in parallel with preventing the one or more additional requests from being transmitted to the server, that a number of requests transmitted by a third client to a server during a third time period is greater than the first threshold.

9. The method of claim 3, further comprising:
determining that a number of the additional requests transmitted by the first client to the server match the one or more additional attack patterns; and
preventing one or more of the additional requests from being transmitted to the server if the number of additional requests that matches one or more attack patterns is greater than a second threshold.

10. A system for mitigating a denial of service attack, the system comprising:
at least one memory that includes a software application; and
a processor that is coupled to the memory, wherein, when the processor executes the software application, the processor is configured to:
determine that a number of requests transmitted by a first client to a server during a first time period is greater than a first threshold;
in response, classify the first client as a top talker;
generate one or more first attack patterns based on the requests transmitted by the first client to the server;
determine, at least partially in parallel with generating the one or more first attack patterns, that a number of requests transmitted by a second client to a server during a second time period is greater than the first threshold;
identify additional requests being transmitted by at least one of the first client to the server;
determine that a number of the additional requests transmitted by the at least one of the first client and the second client to the server matches the one or more first attack patterns; and
prevent one or more of the additional requests from being transmitted to the server if the number of additional requests is greater than a second threshold.

11. The system of claim 10, the method further comprising:
blacklisting at least one of the first client or second client for a predetermined time if the number of additional requests from the first client or the second client that matches the one or more first attack patterns is greater than a third threshold.

12. The system of claim 11, the method further comprising:
determining, for the server, that a latency of processing queued requests exceeds a first limit.

13. The system of claim 12, the method further comprising:
determining one or more additional attack patterns based on one or more of the queued requests.

14. The system of claim 12, the method further comprising:
adjusting the first threshold and the third threshold in response to the determination that the latency of processing queued requests exceeds the first limit.

15. The system of claim 12, the method further comprising:
determining, for the server, that the latency for processing queued requests falls below a second limit; and
ceasing mitigation of the denial of service attack in response to the latency falling below the second limit.

16. A non-transitory computer readable storage medium including instructions that, when executed by a processor, cause the processor to perform the steps of:
determining that a number of requests transmitted by a first client to a server during a first time period is greater than a first threshold;
in response, classifying the first client as a top talker;
generating one or more first attack patterns based on the requests transmitted by the first client to the server;
determining, at least partially in parallel with generating the one or more first attack patterns, that a number of requests transmitted by a second client to a server during a second time period is greater than the first threshold;
identifying additional requests being transmitted by the at least one of the first client and the second client to the server;
determining that a number of the additional requests transmitted by the at least one of the first client and the second client to the server matches the one or more first attack patterns; and
preventing one or more of the additional requests from being transmitted to the server if the number of additional requests is greater than a second threshold.

17. The non-transitory computer readable storage medium of claim 16, the method further comprising:
blacklisting at least one of the first client and the second client for a predetermined time if the number of additional requests transmitted by the first client or the second client that matches the one or more new attack patterns is greater than a third threshold.

18. The non-transitory computer readable storage medium of claim 17, the method further comprising:
determining, for the server, that a latency of processing queued requests exceeds a first limit.

19. The non-transitory computer readable storage medium of claim 18, the method further comprising:
determining one or more additional attack patterns based on one or more of the queued requests.

20. The non-transitory computer readable storage medium of claim 18, the method further comprising:
adjusting the first threshold and the third threshold in response to the determination that the latency of processing queued requests exceeds the first limit.

21. The non-transitory computer readable storage medium of claim 18, the method further comprising:
determining, for the server, that the latency for processing queued requests falls below a second limit; and
ceasing mitigation of the denial of service attack in response to the latency falling below the second limit.

* * * * *

UNITED STATES PATENT AND TRADEMARK OFFICE
CERTIFICATE OF CORRECTION

PATENT NO. : 9,912,678 B2  
APPLICATION NO. : 14/748571  
DATED : March 6, 2018  
INVENTOR(S) : Yujie Zhao et al.

Page 1 of 2

It is certified that error appears in the above-identified patent and that said Letters Patent is hereby corrected as shown below:

In the Claims

Column 15, Claim 11, Lines 54-55, please delete "the method further comprising" and insert --wherein the processor is further configured to--;

Column 15, Claim 11, Line 56, please delete "blacklisting" and insert --blacklist--;

Column 15, Claim 12, Lines 61-62, please delete "the method further comprising" and insert --wherein the processor is further configured to--;

Column 15, Claim 12, Line 63, please delete "determining" and insert --determine--;

Column 15, Claim 13, Lines 65-66, please delete "the method further comprising" and insert --wherein the processor is further configured to--;

Column 16, Claim 13, Line 1, please delete "determining" and insert --determine--;

Column 16, Claim 14, Lines 3-4, please delete "the method further comprising" and insert --wherein the processor is further configured to--;

Column 16, Claim 14, Line 5, please delete "adjusting" and insert --adjust--;

Column 16, Claim 15, Lines 8-9, please delete "the method further comprising" and insert --wherein the processor is further configured to--;

Column 16, Claim 15, Line 10, please delete "determining" and insert --determine--;

Column 16, Claim 15, Line 12, please delete "ceasing" and insert --cease--;

Column 16, Claim 17, Line 40, please delete "the method";

Signed and Sealed this  
Nineteenth Day of June, 2018

Andrei Iancu  
*Director of the United States Patent and Trademark Office*

CERTIFICATE OF CORRECTION (continued)
U.S. Pat. No. 9,912,678 B2

Column 16, Claim 18, Line 47, please delete "the method";

Column 16, Claim 19, Line 51, please delete "the method";

Column 16, Claim 20, Line 55, please delete "the method";

Column 16, Claim 21, Line 60, please delete "the method".